United States Patent
Notz et al.

(10) Patent No.: US 7,016,864 B1
(45) Date of Patent: Mar. 21, 2006

(54) INTERACTIVE UPSELL ADVISOR METHOD AND APPARATUS FOR INTERNET APPLICATIONS

(75) Inventors: John W. Notz, Evanston, IL (US); Andrew Hefele, Cedar Park, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/290,027

(22) Filed: Apr. 9, 1999

(51) Int. Cl.
*G06F 17/60* (2006.01)

(52) U.S. Cl. .......................... 705/26; 705/27; 709/217; 709/228

(58) Field of Classification Search ............ 705/1, 705/26, 27, 28, 29, 10, 14; 709/203, 217, 709/219; 707/9, 10, 104, 14
See application file for complete search history.

(56) References Cited

U.S. PATENT DOCUMENTS

| | | | |
|---|---|---|---|
| 4,949,257 A | | 8/1990 | Orbach |
| 5,513,116 A | | 4/1996 | Buckley et al. |
| 5,546,316 A | | 8/1996 | Buckley et al. |
| 5,559,714 A | | 9/1996 | Banks et al. |
| 5,561,604 A | | 10/1996 | Buckley et al. |
| 5,572,572 A | | 11/1996 | Kawan et al. |
| 5,583,763 A | | 12/1996 | Atcheson et al. |
| 5,726,898 A | | 3/1998 | Jacobs |
| 5,768,142 A | | 6/1998 | Jacobs |
| 6,038,597 A * | | 3/2000 | Van Wyngarden .......... 709/219 |
| 6,055,513 A * | | 4/2000 | Katz et al. ................... 705/26 |
| 6,092,189 A * | | 7/2000 | Fisher et al. .................... 713/1 |
| 6,119,099 A * | | 9/2000 | Walker et al. ................. 705/16 |
| 6,167,383 A * | | 12/2000 | Henson ........................ 705/26 |
| 6,182,275 B1 * | | 1/2001 | Beelitz et al. ................. 717/1 |
| 6,196,458 B1 * | | 3/2001 | Walker et al. .............. 235/380 |

FOREIGN PATENT DOCUMENTS

WO   WO 009802835 A1 *   1/1998

OTHER PUBLICATIONS

O'Malley, Chris, "Choosing the perfect home PC", Computer shopper, v16, n9, p138 (9), Sep. 1997.*

* cited by examiner

*Primary Examiner*—Hani M. Kazimi
(74) *Attorney, Agent, or Firm*—Haynes and Boone, LLP (57) ABSTRACT

A web-based online store user interface enables custom configuration of a computer system according to identification of a user belonging to a prescribed customer set. A configurator configures a computer system with options selected according to a desired user input, and presents the options and a respective pricing for each option on a configurator web page. A database dynamically supplies configuration options to the configurator in accordance with identification of the user belonging to the customer set. A cart temporarily stores a configured computer system and presents the configured system on a cart web page. Lastly, an interactive upsell advisor operatively couples to the configurator, the database, and the cart, wherein the advisor selectively provides an upsell recommendation to the cart as a user selectable cart option on the cart web page, further as a function of the customer set, the configured computer system, and upsell advisor business rules.

18 Claims, 5 Drawing Sheets

INTERACTIVE UPSELL ADVISOR METHOD AND APPARATUS FOR INTERNET APPLICATIONS

BACKGROUND

The disclosures herein relate generally to built to order computer systems, and more particularly, to an online store user interface for enabling custom configuration, pricing, and ordering of a computer system via the Internet.

This application relates to co-pending U.S. patent application Ser. No. 09/009,401, filed on Jan. 19, 1998, entitled "Method and Apparatus For Providing And Accessing Data At An Internet Site", naming Amy Van Wyngarden as inventor, now U.S. Pat. No. 6,038,597, issued Mar. 14, 2000, incorporated herein by reference in its entirety, and assigned to the assignee of the present invention.

This application relates to co-pending U.S. patent application Ser. No. 09/158,564, filed on Sep. 22, 1998, entitled "Method and Apparatus For Providing Customer Configured Machines At An Internet Site", naming Ken Henson as inventor, now U.S. Pat. No. 6,167,383, issued Dec. 26, 2000, incorporated herein by reference in its entirety, and assigned to the assignee of the present invention.

With a first generation web based on-line store, a customer was given an ability to select a base computer system (or chassis), customize the system, and price it. Such an on-line store focused initially upon the bare necessities. That is, build a system and get a price.

In the prior online store, a configurator allowed a customer to customize a system and procure it online. The configurator allowed a customer to select a given computer system model and to customize the computer system according to the user selected options. Such a configurator was most well received by persons in the know about a particular computer system, that is, those who were very self-sufficient without the assistance of a sales representative. However, the earlier generation online store was not user friendly in than it merely wet the appetite of the less sales-sufficient computer customers. In the later instance, the previous online store allowed such customers to answer one of their questions, but not all of them. Those customers still needed be assistance of a sales representative. In addition, with the prior online store, there was an assumption that in presenting all available options, the options all work together and the customer wouldn't be creating a system that could not be built by manufacturing. That assumption was not always correct.

Further with respect to the previous generation on-line store, a disadvantage was that a customer could place an order and find out only later, after the order was taken off of the on-line system and entered into another order management system, that the customer-configured system shipment would be delayed (i.e., more than the typical build time and delivery). It was the order management system which would inform a sales representative to communicate with the customer. Typically, the sales representative who would inform the customer of a final order amount and confirmation of the order. In addition, it was only then that the customer would find out that, "oh by the way, the delivery time for that system is five weeks." At that, the customer would be highly inclined to cancel the order, since the customer thought that the system would be shipped within a typical delivery time (on the order of about a week).

The prior methods used for an online store included a web objects-based application providing the capability to custom-configure and order a particular computer system. The initial online store application offered customers the ability to select and price key system options, the ability to include multiple systems on a single order, and the ability to provide information necessary for the placement of a standard computer system order.

The capability to self-select system options and then price them was afforded through the presence of an online configurator. This configurator enabled customer selection of key, system-defining components from a display of available system options for a chosen system. The display of available options included the presentation of a "delta" price, wherein a change in system price was affected by selection of an option. The configurator afforded the ability to update overall system priced based upon selections made. The capability to include multiple items in a single order was afforded by the presence of a "shopping cart", wherein the shopping cart represents an equivalent to the traditional shopping cart. The shopping cart enabled customers to group disparate systems together as an order, as well as specify a quantity for each individual system to be included on the order. Furthermore, the capability to provide customer-specific information required for the placement of a standard order was afforded through the presence of an online "checkout", the checkout including essentially a form for facilitating the capture of requested and required information. The checkout form included simple logic rules to assure entry of the required fields.

The prior generation web-based online store application was problematic in that a responsiveness to customer requests was becoming unacceptable, for example, on the order of upwards of fifty percent (50%) of requests were unmet during peak business hours. Maintenance of a programming code for the online store was more time intensive and less scalable than desired. The feature set of the online store offered little to no point-of-sale merchandising capability. The feature set of the online store still further offered no means for delivering more detailed option information. Yet still further, the feature set of the online store offered no means for warning customers as to known compatibility issues between select system options. The feature set also offered no means for communicating the effect selection of certain system options would have on the system's delivery time. A customization of the online store for use by various business segments within the online store vendor or computer system manufacturer was less than optimal. The net effect of the problems with the prior online store included lost business and decreased customer satisfaction with the online buying experience.

Selling on the Internet furthermore has some handicaps relative to other sales channels, such as telephone sales. Primarily, with the absence of a live sales representative, an online merchant has a harder challenge guiding potential customers to particular products that are both suitable for the customer and profitable for the online merchant. Prior methods have included "passive" sales messaging, or the making of blind recommendations to potential customers. In addition, interactive cross-selling has been used, wherein a customer is given suggestions for additional products based upon the products that the customer has already purchased.

In the on-line store, a customer accesses the on-line store as a specific customer type (e.g., federal, home, business, etc.). The customer configures a desired computer system using the configurator. The customer then decides either to purchase the computer system just configured or add the configured computer system to the shopping cart.

In the previous on-line store, the shopping cart was used for cross-selling. For instance, a cross-sell might include a merchandising statement with respect to a printer to go along with the computer system. The cross-sell may also include reference to a tape drive to go along with the computer system just configured. Essentially, upon reaching the shopping cart, messaging for cross-selling were presented, based upon customer type and the configured computer system.

Other problems existed in the previous generation online store including a lack of responsiveness to customer requests. In addition, the previous generation online store suffered from an incompleteness of information delivery with respect to a servicing of customer demand for computer system related information. Still further, system incompatibility issues were not addressed. An improved accuracy, reliability, and overall quality of the online store and buying experience for overcoming the problems as discussed above is thus desired.

SUMMARY

According to one embodiment, upselling includes the interactive suggesting of a higher-grade product as a replacement to what a customer has already selected as part of a custom configured computer system. More particularly, a web-based online store having a user interface for enabling a custom configuration of a computer system according to an identification of a user belonging to a prescribed customer set is disclosed. A configurator is provided for configuring a computer system with options selected according to a desired user input, the options and a respective pricing for each option being presented on a configurator web page. A database is provided for dynamically supplying configuration options to the configurator in accordance with the identification of the user belonging to the prescribed customer set. A cart temporarily stores a customer configured computer system and presents the customer configured computer system on a cart web page, the cart web page including at least one user selectable cart option. Lastly, an interactive upsell advisor is operatively coupled to the configurator, the database, and the cart for selectively providing an upsell recommendation to the cart as a user selectable cart option on the cart web page. The upsell recommendation is a function of the prescribed customer set, the customer configured computer system, and prescribed upsell advisor business rules.

The embodiments of the present disclosure advantageously enable an interactive and selective providing of upsell recommendations to a user with respect to custom configurable computer systems obtainable via an online store.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

In conjunction with the present embodiments, an on-line store is one component of an Internet website for which a customer may go to configure a particular computer system, for example, according to desired options of the customer. The on-line store is typically a subset of a larger Internet website. At the on-line store, a customer can select one or more products that the customer is interested in. Upon selection of a particular product, the on-line store presents the customer with the ability for the customer to go to the product information for the particular product, customize the product, price the customized product, purchase the product, and other actions as discussed herein. While shopping happens in the website (i.e., selection of a particular kind of system (chassis) by a customer), when the customer is ready to purchase a customized system, the customer is then directed (invisibly) to that part of the website which the on-line store application controls.

Figure 1:
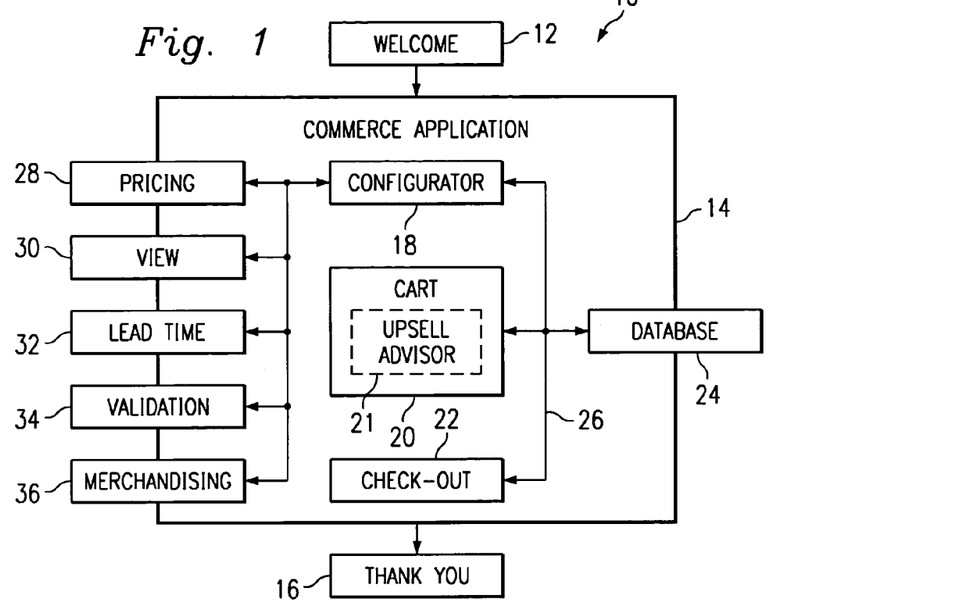
FIG. 1 illustrates an overview block diagram representation of the on-line store according to the present disclosure.

Referring now to FIG. 1, the present implementation of an online store 10 for use in generating customer configured machines, i.e., customer configured computer systems, will be discussed herein below. The online store 10 includes a welcome or introductory module 12, a commerce application module 14, and a thank you module 16 (i.e., appreciation for your order). The present embodiments further include an enhanced online store user interface which advantageously enables the system configuration, pricing, and ordering of a computer system via the Internet. The commerce application 14 includes a configurator 18, shopping cart 20, checkout 22, and database 24. An active upsell advisor 21 is included within shopping cart 20. The database 24 provides information to the configurator 18, shopping cart 20, and checkout 22, as illustrated by arrows 26. The configurator 18 includes a pricing module 28, a view module 30, a lead time warning module 32, a validation (or compatibility) warning module 34, and a merchandising module 36. The various modules of the configurator 18 are being driven by data from the database 24, as further discussed herein below.

The online store 10 includes welcome page 12, configurator page 18, cart 20, checkout 22, and thank you page 16. The welcome page 12 includes a static page and generally resides outside of the commerce application 14. The configurator, cart, and checkout are within the commerce application and are prone to be driven off the database, thus the configurator, shopping cart, and checkout are each linked to the database as illustrated in FIG. 1. The cart includes a cart merchandising message feature and active upsell advisor 21, each of which are driven off of the database, further as discussed herein. Still further, the checkout includes a payment feature, delivery feature, personal verses business feature, and instructional ext features (i.e., how to fill out an online form).

The welcome page 12 is typically an introductory page and includes a link into the online store 10. The welcome page is typically a static welcome page. The online store 10 includes a smart process for the configurator 18, cart 20, and checkout 22 which are all driven by the database 24. Upon completion of a checkout, a customer would be linked to a static thank you page 16. The thank you page 16 provides a message of gratitude to the customer for having placed the order or for visiting the online store.

As discussed herein, the online store of the present disclosure includes a smart process. The degree of smartness of the present online store is greater than that of a prior online store, wherein a level of smartness in the prior online store was focused on the configurator. The configurator of the prior online store would present to the user the system selected off from the welcome page and include all available options. The smartness of the prior online store was in describing the choices for the system which the customer had selected. The present online store takes into account that some choices are not as right as others. Thus the configurator of the present online store has been made starter. A level of smartness has also been added to the shopping cart and the checkout, where such a level of smartness did not exist previously. Thus the smartness of the configurator has been improved and smartness has been added to the cart and checkout. Programming code for executing the improved smartness and the added smartness can be included in a separate programming module or software package or can be integral with the online store commerce application. The database and the online commerce application that drives the database make up the online store. The database can be included within the commerce application of the online store, also. Programming code and the functions as described herein may be implemented using programming techniques well known in the art.

Referring once again to FIG. 1, aspects of the configurator 18 which are being driven by the database 24 are illustrated. In essence, the entire configurator 18 is being driven by the database. As mentioned, the configurator 18, shopping cart 20, and checkout 22 are each part of the commerce application 14 and subject to be driven by the database 24. For example, with the shopping cart 20, there can be provided upsell information and/or merchandising information coupled with a particular system which has been configured and placed in the shopping cart by an online store customer, as will be discussed further herein below.

Figure 2:
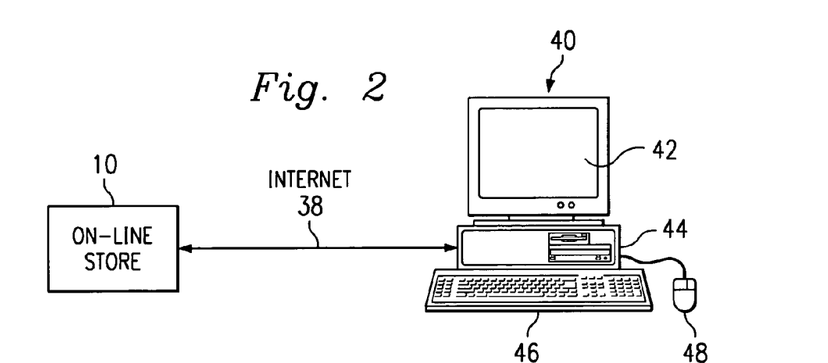
FIG. 2 illustrates access to the on-line store via the Internet using a computer system according to one embodiment of the present disclosure.

Turning now to FIG. 2, a customer can access the online store 10 using any suitable computer equipment 40, via the Internet 42. The computer equipment 40 may include a display 42, computer 44, keyboard 46, and pointing device 48. Display 42 is used for displaying the various pages of the online store while a customer is using the online store.

Figure 7:
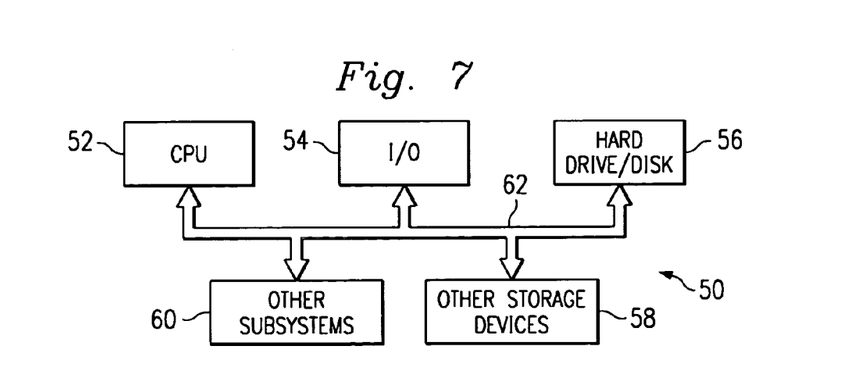
FIG. 7 is a block diagram of an exemplary personal computer system configured using the online store and active upsell advisor of the present disclosure.

Referring briefly to FIG. 7, a system block diagram of a computer system 50 is shown having features thereof configured in accordance with the online store 10 as discussed herein. The computer system 50 includes a central processing unit (CPU) 52, input/output (I/O) devices, such as a display, a keyboard, a mouse, and associated controllers, collectively designated by a reference numeral 54, a hard disk and drive 56, and other storage devices, such as a floppy disk and drive and the like, collectively designated by a reference numeral 58, and various other subsystems, collectively designated by a reference numeral 60, all interconnected via one or more buses, shown collectively in FIG. 7 as a bus 62.

The present method and apparatus includes an intelligent "upsell advisor" for use on a website, and more particularly, an online store. When a customer has configured a computer system in the online store and added the configured system to the virtual shopping cart, the upsell advisor of the present disclosure operates in a prescribed manner to check the configuration for upgrade opportunities. When the upsell advisor identifies a system option (for example, the hard disk drive selection) that is an upsell opportunity, then the upsell advisor gives the customer a special message that includes an option to upgrade to a higher selection and further explains advantages of doing so. If the upsell is accepted, the customer's order is automatically updated. In addition, the upsell advisor keeps track of a customer having already accepted a particular upgrade and will not persist to upsell the given customer for that particular system.

The present embodiment further provides an interactive upsell, responsive to a customer type and a configured computer system. The upsell advisor acknowledges a particular configured computer system and where prescribed upsell opportunities exist, presents the upsell opportunities to the potential customer for consideration. The upsell advisor presents upgrades, when available according to prescribed business rules, with respect to a particular customer configuration. In addition to the upgrade information, a cost differential and technical advantage information are provided to the potential customer for consideration. The customer can then consider the upgrade and decide whether or not the upsell is more desirable than the original configured computer system without the upgrade. The upsell advisor provides a description of the proposed upgrade, a price differential, and any technical advantages, as may be appropriate. For example, an upsell message may include information acknowledging a custom configured computer system with 32 MBytes of memory and that a 64 Mbyte memory is available for a price differential of a prescribed amount. Furthermore, the upsell message can include an indication that the upgraded computer system will include a prescribed technical advantage, e.g., in that it will be so much faster, so much better, etc. The upsell advisor provides an upsell message based upon customer type, custom configured computer system, and upsell availability for the customer type and customer configured computer system. The upsell advisor takes into account as much as possible about the given customer type, a custom configured computer system, available options for the custom configured computer system, and what a customer of the given customer type will most likely desire with a particular type of custom configured computer system. The preceding attributes form a basis for the upsell advisor of the present disclosure.

At a highest level, the upsell advisor first considers what type of customer a given customer is (e.g., Are you a federal customer?; Are you a home customer?; Are you a business customer?). There may be certain business rule reasons for upselling a particular upgrade to one customer type while not upselling that same upgrade to another customer type. For example, there may be a reason for not providing a 32 Mbyte to 64 Mbyte memory upsell to a federal customer, however, the memory upsell is appropriate for a home customer type. In addition, different businesses may be assigned different business customer types, wherein a first business type customer may have the 32 Mbyte to 64 Mbyte memory upsell available to them and a second business type customer may not. The first business type customer may include a large business organization having liberal purchasing restrictions on its employees, thus allowing its employees wider freedom to custom configure computer systems for purchase and use at their respective place of business. On the other hand, the second business type customer may include a small business organization having tight purchase restrictions on its employees, allowing for only a few options to be available to its employees for custom configuration of a computer system. The upsell advisor may utilize any number of business rules to be applied for different customer types.

At a next level, the upsell advisor may consider the base configuration which the customer of the given customer set selected. Did the customer select and/or configure a notebook, a desktop, or a server, for example. Still further, the upsell advisor may then consider what options did the customer select for configuring the specific base configuration. For example, did the customer select a 64 MByte memory, a 10 GByte hard disk drive, one year of service or three years of service? Taking all of the options into account, the upsell advisor then returns to a prescribed set of business rules for the given customer type and base configuration pre-established in a database, what, if any, upsell should be provided. If more than one upsell are available, then the upsell having a highest rating is selected for being presented to the customer of the on-line store.

One example implementation of the upsell advisor may include a determination that the on-line store user is a federal customer, the base configuration is a notebook, and the selection of 128 MBytes RAM. In such an instance, there might be three upsell options available. One upsell option could include an increase from 128 MBytes RAM to 256 MBytes RAM. Another upsell option could include an upgrade to three years of a service. Yet another upsell option may include an upgrade to a 15 GByte hard disk drive. At any given time, the priority for each upsell option may be different. The on-line store merchant may decide for a given period of time that service is to receive a highest priority of the available upsell options, where service may provide a highest margin for the given period of time. For another period of time, the upsell option to receive a highest priority may include memory, for example, where the on-line store merchant has a special deal on memory and desires to promote computer systems with higher memory. The priority of the available upsell options is preferably determined according to a given set of business rules established by the on-line store merchant.

The upsell advisor of the present disclosure is a dynamic advisor, i.e., driven by a database. For instance, on any given date, business rules for the upsell advisor may provide a first set of upsell recommendations whereas, the upsell recommendations one day/week later may be different, as provided according to upsell information stored in the database. The database can include an Intranet connection or the like, for being updated by authorized personnel of the online store merchant, for implementing a prescribed set of business rules in conjunction with the upsell advisor.

Every configuration will have different modules, hard disk drives, per customer configured machine. The present embodiments provide for analyzing and/or processing base configuration and options of a customer configured computer system and providing an upsell recommendation in response to the analysis.

Figure 3:
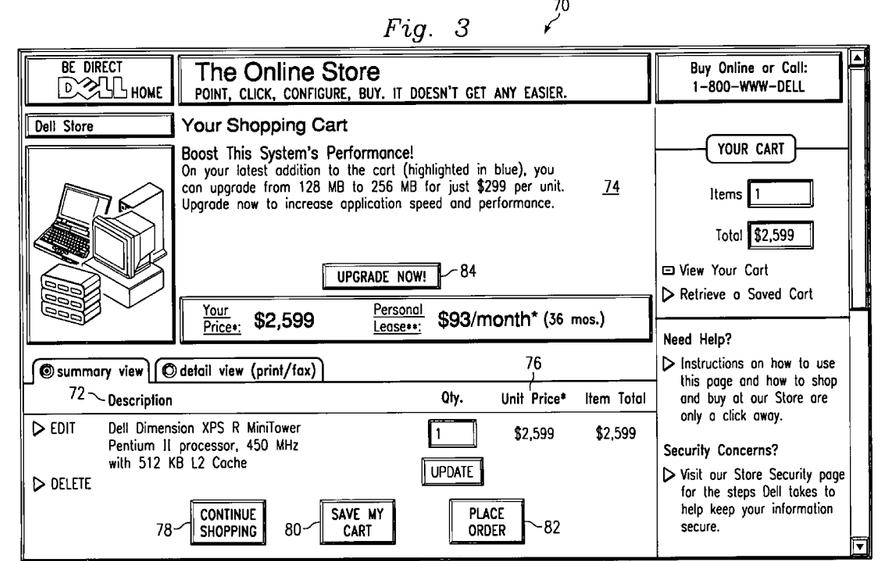
FIG. 3 illustrates an exemplary page of the on-line store including the active upsell feature of the customer configured machine method and system apparatus of the present disclosure.

Referring now to FIG. 3, an exemplary shopping cart screen display 70 is illustrated. The screen display is of the shopping cart or basket of the online store subsequent to a customer configuring a desired computer system. A summary view 72 of items in the shopping cart are illustrated. In this example, only one item is shown, however more than one custom configurable item could be included. With the upsell advisor 21, an active upsell 74 is provided for the last custom configured computer system to be placed in the shopping cart 20. As shown in FIG. 3, the last custom configured computer system to be placed in the shopping cart includes a Dell Dimension XPS R MiniTower, Pentium®II processor, 450 MHZ with 512 KB L2 Cache and a unit price 76. In this example, the active upsell 74 is available and presented on the display 70. As shown, the online store customer has several options available for selection. The options include a continue shopping option 78, a save my cart option 80, and a place order option 82. The options further include an active upsell upgrade now option 84. For each option, there is a respective button, that if selected, will carry out the desired option.

Figure 4:
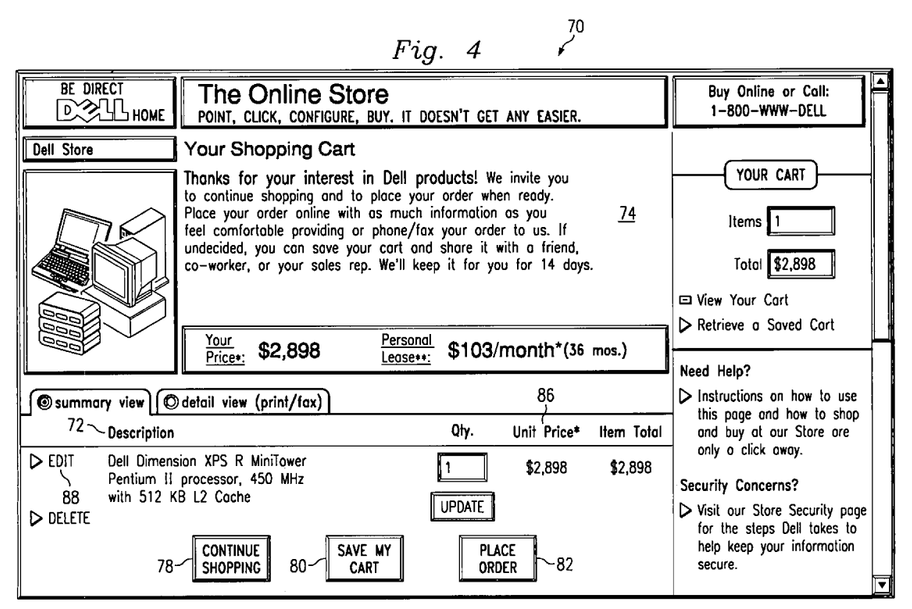
FIG. 4 illustrates an exemplary page of the on-line store subsequent to acceptance of an active upsell upgrade recommendation according to the embodiments of the present disclosure.

Acceptance of the upsell recommendation can be accomplished for example, by clicking on the "upgrade now" button 84 displayed on the display screen 70. Upon acceptance by the customer, the configuration is then changed to incorporate the upsell recommendation of the upsell advisor. Thereafter, if the customer were to go back to view his/her computer system configuration as if to edit the same, then the configuration would have been changed to include the upgraded option therein. The customer can thus actually see what has happened to his/her upgraded configuration. The customer can advantageously review and edit the upgraded configuration further as may be desired. FIG. 4 illustrates the result of the customer's acceptance of the active upsell recommendation of FIG. 3. As illustrated, the active upsell provides an updated price 86 which is displayed to reflect the acceptance of the active upsell. Details of the upgraded configuration can be reviewed, as desired, for example, by selecting EDIT 88 on the display screen 70.

Once an upsell recommendation has been made, an additional upsell recommendation is not made until the customer enters the shopping cart again. Thus, a customer can go to another area of the online store and upon returning to the shopping cart, an upsell recommendation, can be displayed if one exists. Thus, if a first upsell recommendation included a service oriented upgrade, a second upsell recommendation might include a memory oriented upgrade. In addition to the above, various other combinations for presenting the upsell recommendations to a customer are possible. For instance, upon acceptance of a first upsell recommendation, a subsequent upsell recommendation could be presented immediately following acceptance of a first recommendation. This could be repeated until a last upsell recommendation for a given customer configured computer system had been displayed.

If a customer does not wish to select the upsell recommendation, then upon exiting the shopping cart and re-entering the shopping cart, so long as last entered custom configurated computer system remained the same, the upsell recommendation would be the same.

In another embodiment, if a customer exits the shopping cart without selecting the upsell recommendation and later re-enters the shopping cart with the same custom configured computer system, then a next upsell recommendation in a given priority order can be displayed. The same customer configured computer system means that nothing in the configuration has been changed from the previous time in the cart.

The target configuration of the upsell advisor is preferably the last configurable item in the shopping cart. The shopping cart may contain more than one configurable item at any given time. As items are added to the shopping cart, they are entered first to last, thus the last item is the most recently added item in the shopping cart. The upsell advisor thus provides upsell recommendations (if any) with respect to the last configurable item in the shopping cart. A computer system is an example of a configurable item, whereas a printer is not a configurable item.

The shopping cart online screen display includes a prescribed area, which can have a shared usage as a merchandising area or an active upsell area on a screen display. The prescribed area is a prominent area of the online shopping cart screen display, and can include graphic and text areas, the text including a large font, larger than other fonts used on the online shopping cart screen display.

Certain shopping cart business rules provide directive for whether or not an active upsell is available for a given customer and the custom configured computer system. The business rules are generally as follows, however, may be modified as appropriate for carrying out a desired upsell and implementation of the active upsell advisor.

When the cart loads upon access by an online store customer, the upsell advisor is activated to display upsell recommendations as permitted per respective business rules. Exemplary business rules may include the following. A first business rule might include that the store that the customer is using must allow the upsell advisor. This is part of a customization of each store (e.g., home, business, government (Army, Navy, Air Force, or Marines), etc.) and allows for each business segment of the online store merchant to determine how a respective store will appear. Another business rule might include that the cart must contain at least one configurable item, i.e., an item that the user created and/or modified in the configurator. Only configurable items, i.e., computer systems added to the cart from the configurator, are allowed for upsell recommendations. Non-configurable items, such as printers, scanners, etc. are not eligible for an upsell recommendation.

If the prescribed business rule conditions are met, then the upsell recommendations are loaded from the database. The recommendations are given a prescribed priority or sequenced by authorized business personnel of the online store merchant. The prescribed priority or sequence is used to determine the order of active upsell recommendations presented to and that an online store customer will see.

Each active upsell recommendation is validated prior to being displayed to a customer. Validation includes making sure that a given active upsell recommendation matches the configuration brand, and option selected for the recommended module (e.g., service, memory, HD, etc). Each active upsell recommendation is also validated to make sure that the configuration will continue to be a valid configuration with the upgrade recommendation. If an upsell recommendation is valid, then a differential price is calculated for the given configuration and incorporated into an active upsell message which is displayed on the cart display to the user by the upsell advisor. A graphic representing the module being recommended for the active upsell upgrade can also be retrieved from the database and incorporated into the active upsell recommendation message.

If an upsell recommendation is accepted, the customer's configuration is then changed to reflect the new option for the module. If the user edits the configuration, the user will see the changes that the upsell advisor made. A separate processing page is used for implementing changes to the customer's custom configuration. Such a processing page allows for tracking upsell recommendations which are accepted by customers. In combination with the cart page, statistics can be created for evaluating how many active upsell recommendations and which type were show, taken and rejected for any number of situations (by store, by customer, by recommendation).

Once a custom configuration has been updated, the customer can be returned to the cart to start the process again. Recommendations can appear constantly when valid (that is, if after accepting an upsell recommendation another recommendation is valid, the next in order active upsell recommendation can be made to appear) or just one recommendation per visit to the cart (that is, after accepting an upsell recommendation, another recommendation will not appear until the customer reenters the cart).

Recommendations are preferably dynamic, wherein authorized business personnel of the online store merchant can add/change/delete active upsell recommendations at any time during any given day. Sequencing of the active upsell recommendations is used for advantageously enhancing business sales. If a given business segment of the online store merchant wants to place more emphasis on service, then an active upsell recommendation regarding service is placed at the top of the active upsell recommendation sequence, thus appearing as a first upsell recommendation when valid. The dynamic recommendations feature can be advantageously used by the business segments of the online store merchant to assist in providing maximized margins, advertising a new item, etc.

Figure 5:
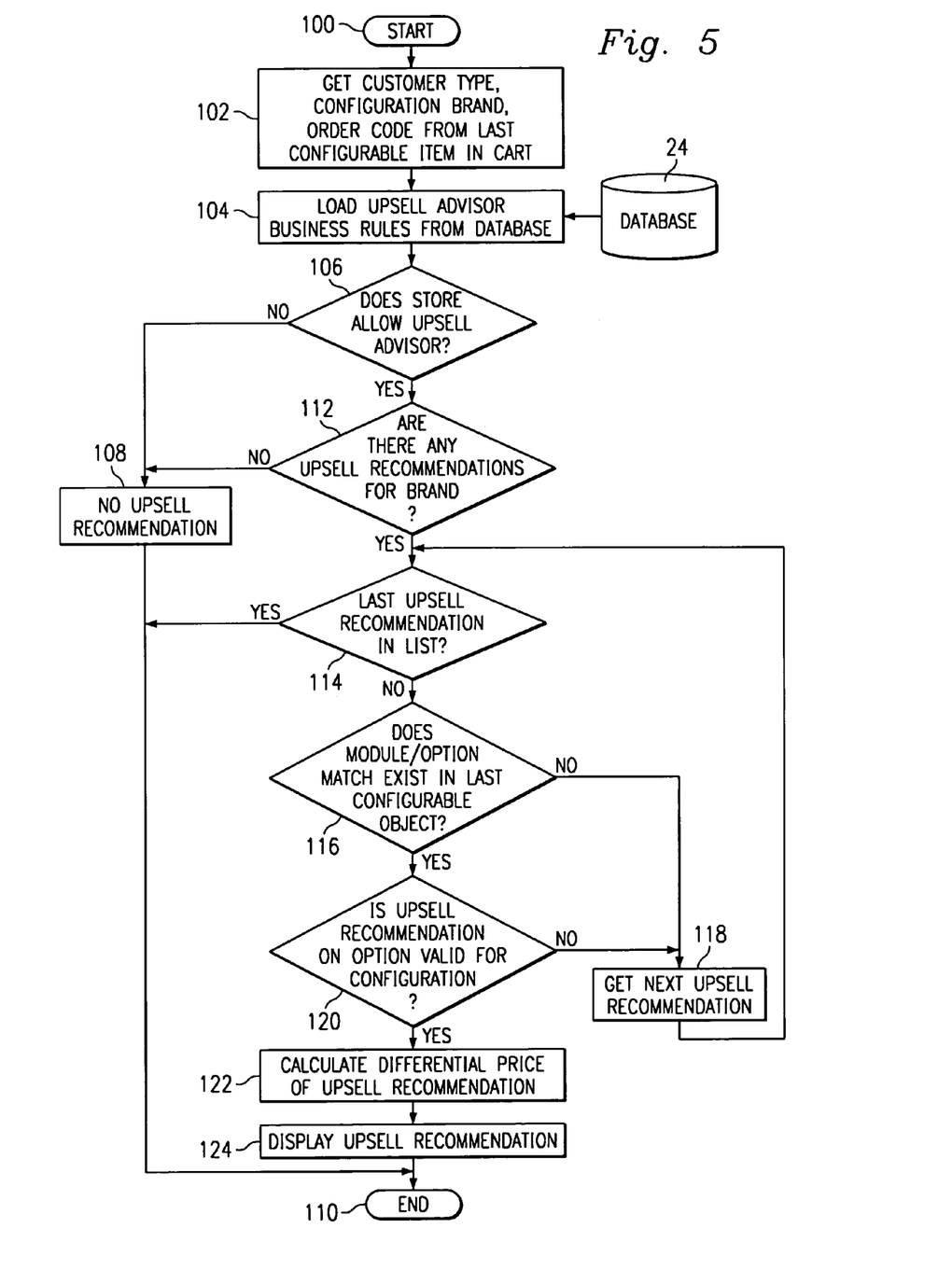
FIG. 5 is a flow diagram of active upsell advisor business rules in accordance with an embodiment of the present disclosure.

The active upsell advisor and business rules shall be further discussed in conjunction with the flow chart of FIG. 5, beginning with step 100. In step 102, the upsell advisor operates to obtain at least the customer type, configuration brand, and an order code from the last configurable item in the shopping cart. In step 104, the upsell advisor business rules from the database 24. In step 106, an inquiry is made as to whether or not the given customer store allows for the upsell advisor. If the store does not allow for the upsell advisor, then the process proceeds with no upsell recommendation (step 108) and ends at step 110. If the store does allow for the upsell advisor in step 106, then the process proceeds to step 112. In step 112, an inquiry is made as to whether or not there are any upsell recommendations for the given brand of the last configurable item in the shopping cart. If there are no upsell recommendations for the given brand, then the process proceeds with no upsell recommendation (step 108) and ends at step 110. If upsell recommendations exist for the given brand of the last configurable item in the shopping cart, then in step 114, an inquiry is made as to whether or not a last upsell recommendation in a prescribed sequence or list of upsell recommendations has been presented. If the last upsell recommendation has been presented, then the process ends at step 110. If the last upsell recommendation has not been presented, then the process continues at step 116. In step 116, an inquiry is made to determine if a given upsell recommendation module/option match exists in the last configurable item of the shopping cart. If no match exists, then the process continues with step 118 and a next upsell recommendation is obtained from the prescribed sequence of upsell recommendations (if any). If a match exists, then in step 120, a validation inquiry is carried out. That is, a determination is made as to whether or not the upsell recommendation for the prescribed option of the given configuration is valid. If not, then the process continues at step 118. If the upsell recommendation is valid, then in step 122, a differential price as a result of the upsell recommendation is calculated. In step 124, the upsell recommendation is displayed. The process then ends at step 110.

Figure 6:
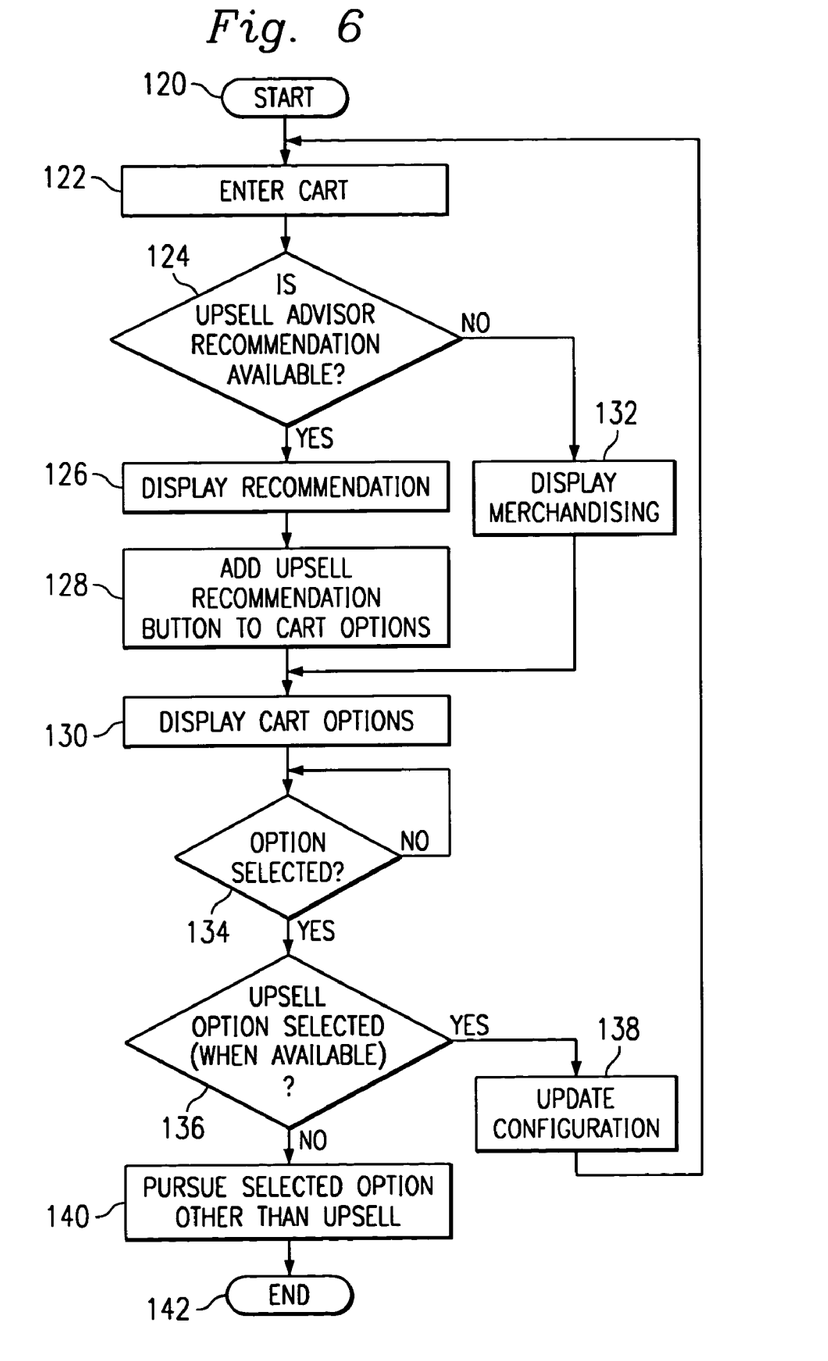
FIG. 6 is a flow diagram of a basket/cart flow chart including the active upsell advisor according to the present disclosures.

The basket/shopping cart process including the active upsell advisor of the present embodiments shall now be further discussed in conjunction with the flow diagram of FIG. 6, beginning with step 120. In step 122, an online customer enters the cart. In step 124, the process as discussed with respect to FIG. 5 is carried out. In particular, in step 124, an inquiry is made as to whether or not an upsell advisor recommendation is available. If the upsell advisor recommendation is available, then in step 126, the upsell recommendation is displayed. In step 128, an upgrade now button for use by a customer in selecting the upsell recommendation is added to the cart options. In step 130, the cart options are displayed. Referring back to step 124, if an upsell advisor recommendation is not available, then in step, a merchandising message is displayed on the cart screen and the process continues at step 130. In step 134, the process awaits selection of a cart option by the customer. Upon selection of a cart option, the process continues with step 136. In step 136, an inquiry is made to determine if the option selected was the upsell recommendation option (when available). If the upsell recommendation option was selected, then in step 138, the configuration is updated with the upsell recommendation and the process returns to the entrance of the cart at step 122. Otherwise, if in step 136, the upsell recommendation was not selected, then in step 140, the selected option other than the upsell is pursued. The process then ends at step 142.

In operation, a customer desiring to configure and purchase a custom computer system would enter the online store at the given merchant's website. Upon reviewing a welcome page, the customer can then enter the configurator to configure a custom configured computer system. Upon configuring a desired system, the customer then places the configured computer system order into the shopping cart or basket. At that point in time, while at the shopping cart page, the shopping cart upsell advisor process as discussed herein is carried out.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A web-based online store having a user interface for enabling a custom configuration of a computer system according to an identification of a user belonging to a prescribed customer set, said online store comprising:
   a configurator for configuring a computer system with options selected according to a desired user input, the options and a respective pricing for each option being presented on a configurator web page;
   a database for dynamically supplying configuration options to said configurator in accordance with the identification of the user belonging to the prescribed customer set;
   a cart for temporarily storing a customer configured computer system and presenting the customer configured computer system on a cart web page, the cart web page further including at least one user selectable cart option; and
   an interactive upsell advisor operatively coupled to said configurator, said database, and said cart for selectively providing an upsell recommendation to said cart as an upgrade now user selectable cart option on the cart web page, the upsell recommendation being selectively provided as a function of the prescribed customer set, the customer configured computer system, and prescribed upsell advisor business rules, wherein said database dynamically supplies the prescribed upsell business rules to said upsell advisor, said business rules including a) whether the store allows the upsell advisor, b) whether there are any upsell recommendations for a given brand of a last configurable item in the cart, c) whether a last upsell recommendation in a prescribed sequence has been presented, d) whether a given upsell recommendation match exists in the last configurable item in the cart, e) whether the upsell recommendation for an item is valid, and f) if valid, a differential price is calculated.

2. The online store of claim 1, wherein said upsell advisor further providing the differential price to said cart.

3. The online store of claim 2, wherein a description of the upsell recommendation, the differential price, and the upgrade now user selectable option are each displayed on the cart web page.

4. The online store of claim 3, wherein a description of the upsell recommendation, the differential price, and an upgrade now user selectable option are further displayed in a prominent area of the cart web page.

5. The online store of claim 1, wherein said cart further includes merchandising recommendations for available options and their respective option details, the merchandising recommendations being presented on the cart web page in the event of an unavailability of the upsell recommendation by said upsell advisor, wherein said database dynamically supplies the merchandising recommendations to said cart in accordance with a prescribed customer set.

6. The online store of claim 1, wherein said upsell advisor validates an upsell recommendation for the given customer configured computer system prior to providing the upsell recommendation to said cart.

7. A method for enabling a custom configuration of a computer system according to an identification of a user belonging to a prescribed customer set via a user interface of a web-based online store comprising:
   providing a configurator for configuring a computer system with options selected according to a desired user input, the options and a respective pricing for each option being presented on a configurator web page;
   providing a database for dynamically supplying configuration options to the configurator in accordance with the identification of the user belonging to the prescribed customer set;
   providing a cart for temporarily storing a customer configured computer system and presenting the customer configured computer system on a cart web page, the cart web page further including at least one user selectable cart option; and
   providing an interactive upsell advisor operatively coupled to the configurator, the database, and the cart for selectively providing an upsell recommendation to the cart as an upgrade now user selectable cart option on the cart web page, the upsell recommendation being selectively provided as a function of the prescribed customer set, the customer configured computer system, and prescribed upsell advisor business rules, wherein the database dynamically supplies the prescribed upsell business rules to the upsell advisor, business rules including a) whether the store allows the upsell advisor, b) whether there are any upsell recommendations for a given brand of a last configurable item in the cart, c) whether a last upsell recommendation in a prescribed sequence has been presented, d) whether a given upsell recommendation match exists in the last configurable item in the cart, e) whether the upsell recommendation for an item is valid, and f) if valid, a differential price is calculated.

8. The method of claim 7, wherein the upsell advisor further providing the differential price to the cart.

9. The method of claim 8, wherein a description of the upsell recommendation, the differential price, and the upgrade now user selectable option are each displayed on the cart web page.

10. The method of claim 9, wherein a description of the upsell recommendation, the differential price, and an upgrade now user selectable option are further displayed in a prominent area of the cart web page.

11. The method of claim 7, wherein the cart further includes merchandising recommendations for available options and their respective option details, the merchandising recommendations being presented on the cart web page in the event of an unavailability of the upsell recommendation by the upsell advisor, wherein the database dynamically supplies the merchandising recommendations to the cart in accordance with a prescribed customer set.

12. The method of claim 7, wherein the upsell advisor validates an upsell recommendation for the given customer configured computer system prior to providing the upsell recommendation to the cart.

13. The web-based online store of claim 1 wherein if after accepting an upsell recommendation, another recommendation is valid, the next in order active upsell recommendation is provided.

14. The method of claim 7 wherein if after accepting an upsell recommendation, another recommendation is valid, the next in order active upsell recommendation is provided.

15. The web-based online store of claim 1 wherein if after exiting the cart without accepting an upsell recommendation and upon later reentering that cart, a different upsell recommendation is offered.

16. The web-based online store of claim 15 wherein a next upsell recommendation in a given priority order is displayed as the different upsell recommendation.

17. The method of claim 7 wherein if after exiting the cart without accepting an upsell recommendation and upon later reentering that cart, a different upsell recommendation is offered.

18. The method of claim 17 wherein a next upsell recommendation in a given priority order is displayed as the different upsell recommendation.

* * * * *